June 19, 1928.

C. H. SEMPLE 1,674,526

METHOD OF MAKING THE JOINTS OF INNER TUBES

Filed Dec. 23, 1924

Inventor.
Charles H. Semple.
by his Attorneys.
Howson & Howson

Patented June 19, 1928.

1,674,526

UNITED STATES PATENT OFFICE.

CHARLES HERBERT SEMPLE, OF YOUNGSTOWN, OHIO, ASSIGNOR, BY DIRECT AND MESNE ASSIGNMENTS, TO SEMPLE-LEE PROCESSES, INC., OF AKRON, OHIO, A CORPORATION OF DELAWARE.

METHOD OF MAKING THE JOINTS OF INNER TUBES.

Application filed December 23, 1924. Serial No. 757,691.

My invention relates to the manufacture of inner tubes of automobile tires, or other tubes that are formed in a continuous ring.

The object of the invention is to make a joint between the two ends of a tube quickly and accurately, said joint being strong and requiring but little work in preparing the ends of the tube to make the joint.

Figure 3:
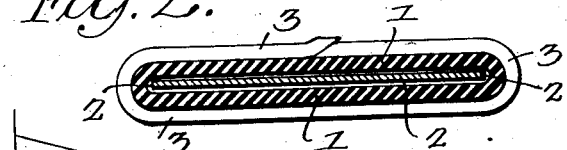
Fig. 3 is a detached perspective view of the parts.

Referring to the drawings, 1, 1 are the two ends of a rubber inner tube that is used in pneumatic tires. The ends are cut off square, as shown in Fig. 3, and a shield and guide 2, of paper, is used to align the two ends of the tube and to keep the unvulcanized surfaces of the rubber from adhering within the tube. This guide is preferably made of bulky soft paper, such as blotting paper, or straw board, so that it may remain in the tube without injury thereto during service. The guide is tapered at one end, as at 4, Fig. 3, to facilitate the bringing of the ends of the rubber tube accurately together for joining them, and both ends may be tapered, if found desirable.

After the ends of the tube are passed over the guide, the ends are carefully washed with high test naphtha or benzol. The two ends of the tube are brought into contact over the guide, which remains in the closed tube. The ends adhere immediately, making a perfect union.

Figure 1:
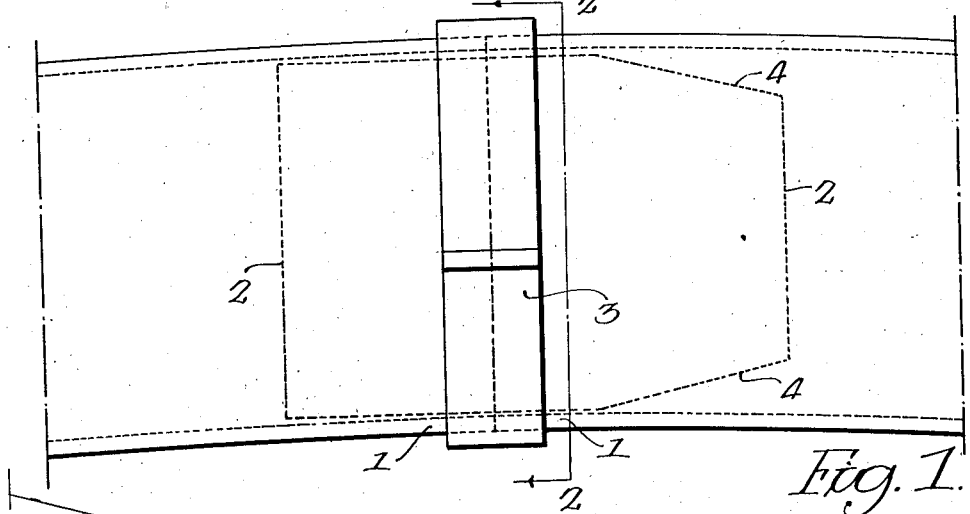
Fig. 1 is a side view of sufficient of a tube of an automobile tire to illustrate my invention, the parts being assembled prior to vulcanizing.
Figure 2:
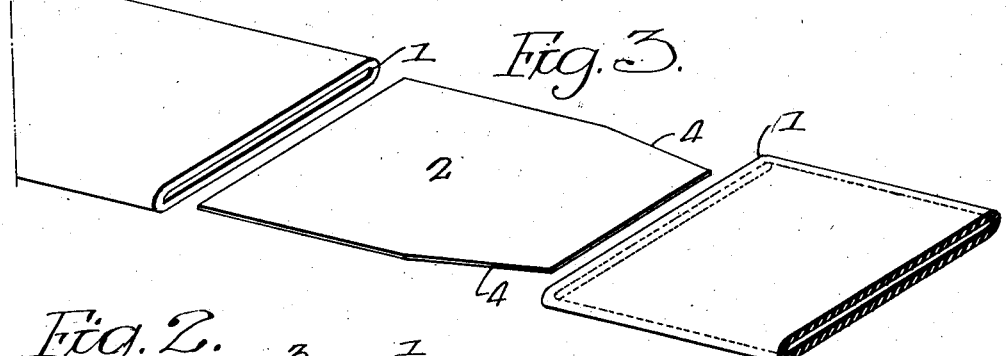
Fig. 2 is a sectional view on the line 2—2, Fig. 1.
Figure 4:
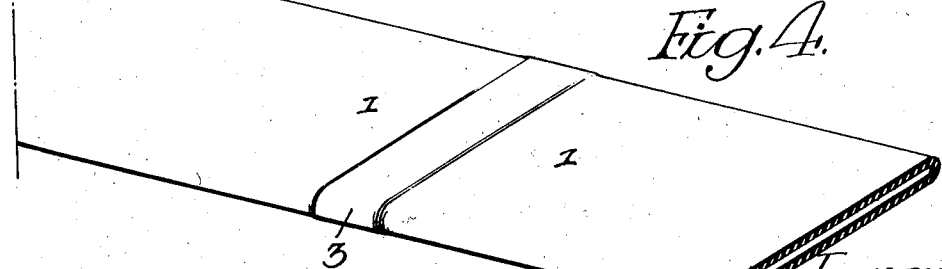
Fig. 4 is a perspective view of a portion of an inner tube showing the completed joint.

Preferably the outer surface of the tube is then washed at the joint with naphtha, or benzol, and a strip 3, of unvulcanized rubber, is wrapped around the joint, as shown in Figs. 1 and 2. One end of the strip 3 is beveled and the other end overlaps this beveled portion, as illustrated in Fig. 2.

When a gas forming substance is used to inflate the tube, a certain quantity of the substance is placed in the tube before the joint is made. The tube is vulcanized in a suitable mold and the substance forming a gas inflates the tube so that it conforms to the mold. The result is a homogeneous rubber tube, which is reinforced at the joint, thereby overcoming liability of leakage at the joint. The joint is scarcely perceptible in the finished tube.

When air is used to inflate the tube, the air valve is placed in position prior to the location of the tube in the mold, and a suitable air connection is provided for inflating the tube while it is in the mold.

The paper guide 2 remains in the tube, as it does not interfere with the inflation of the tube and, being of soft material, it does not cut the tube but preferably is thin and flexible and of a material which will not adhere to and thus add to the thickness and stiffness of the wall.

The valve reinforcements are preferably applied to the tubes prior to vulcanizing. After the tubes are taken from the vulcanizer, the valves are attached and the tubes are ready for packing and delivery.

While the guide has been described as of paper, it may be made of any suitable material, which will separate the walls of a tube. The guide may be placed first in one end of a tube, after which the end is washed, then the opposite end of the tube may be washed and slipped over the tapered end of the guide.

The process hereinbefore described makes it unnecessary to test a tube by inflation, as any defect in the tube prevents it from expanding during the vulcanization and is evident as soon as the mold is opened.

I claim:

The method of joining two ends of rubber tubing which comprises sticking the end portions of the tubing together and pressing them in a flattened condition while preventing adhesion of their inner walls by means of a thin and flexible, non-adhesive shield lying within and bridging the joint of the said end portions.

CHARLES HERBERT SEMPLE.